Patented Aug. 26, 1947

UNITED STATES PATENT OFFICE 2,426,162

1-METHYLOLCYCLOHEXYL-CYCLOHEXYL CARBINOL DIACETATE

Joseph E. Bludworth and Donald P. Easter, Cumberland, Md., assignors to Celanese Corporation of America, a corporation of Delaware No Drawing. Original application January 22, 1944, Serial No. 519,352. Divided and this application December 18, 1944, Serial No. 568,784

1 Claim. (Cl. 260—488)

This invention relates to novel organic compounds and relates more particularly to the ethers and esters of 1-methylolcyclohexyl-cyclohexyl-carbinol.

This application is a division of U. S. application S. No. 519,352, filed January 22, 1944.

An object of our invention is the preparation of the ethers and esters of the methylolcyclohexyl hydrogenation products of $\Delta^3$-tetrahydrobenzaldol.

Another object of our invention is the utilization of said novel ether and ester compounds as plasticizing agents, dispersing agents, and the like.

Other objects of our invention will appear from the following detailed description.

The reaction of acrolein with butadiene in accordance with the Diels-Alder condensation yields $\Delta^3$-tetrahydrobenzaldehyde,

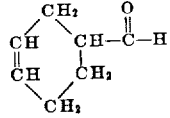

This cyclic aldehyde is quite reactive and, as a starting material, may be employed as a fertile source of novel and valuable synthetic organic materials.

We have now discovered that novel and valuable ethers and esters may be obtained by esterifying or etherifying the hydrogenated aldol condensation product of $\Delta^3$-tetrahydrobenzaldehyde. The aldol condensation of $\Delta^3$-tetrahydrobenzaldehyde yields the aldol condensation product, $\Delta^3$-tetrahydrobenzaldol having the following structural formula,

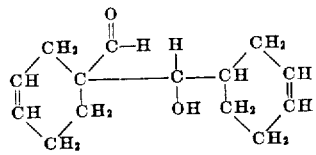

On hydrogenation, this compound yields the polynuclear compound, 1-methylolcyclohexyl-cyclohexyl-carbinol:

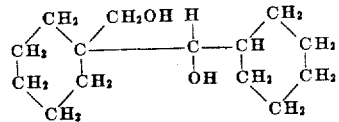

which may, as stated, be esterified or etherified with a suitable esterifying or etherifying medium.

The novel compounds of our invention have the following general formula:

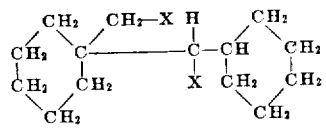

wherein X is a member of the group consisting of —OH, —OR and

not more than one X being —OH, and R is an alkyl, unsaturated alkyl, cycloalkyl, alkaryl, aralkyl, aryl, or heterocyclic radical. By adjusting the mol ratio of etherifying or esterifying agent to the 1-methylolcyclohexyl-cyclohexyl-carbinol, we may etherify or esterify but one of the hydroxy groups and the mono-ethers and mono-esters of 1-methylolcyclohexyl-cyclohexyl-carbinol may thus be obtained.

As examples of acids with which the 1-methylolcyclohexyl-cyclohexyl-carbinol may be esterified, there may be mentioned formic acid, acetic acid, chloracetic acid, glycollic acid, propionic acid, butyric acid, isobutyric acid, lauric acid, stearic acid, acrylic acid, methacrylic acid, crotonic acid, phenylacetic acid, tolyl acetic acid, hexahydrobenzoic acid, cinnamic acid, benzoic acid, as well as acids containing a heterocyclic nucleus such as pyromucic acid and α-pyrrolidine carboxylic acid. Polycarboxylic acids such as glutaric, adipic, suberic, succinic, fumaric and maleic acids may also be employed and cyclic esters obtained. In the case of ethers of 1-methylolcyclohexyl-cyclohexyl-carbinol, R may be the residue of a hydroxy compound, viz. alcohols, such as, for example, methyl, ethyl, propyl, isopropyl, butyl, sec. butyl, acetyl, ethylene chlorohydrin, benzyl, lauryl, stearyl, cyclohexyl, furfuryl, and abietyl alcohol, or ethylene glycol, propylene glycol, phenol, cresol, pyrazolone and hydroxy-pyridine.

The mono- and di-esters of 1-methylolcyclohexyl-cyclohexyl-carbinol may be obtained by esterifying said carbinol compound with the desired organic acid or acid anhydride. Conveniently, the esterification may be effected in solution in a suitable solvent with or without an esterification catalyst, e. g. hydrocholric acid, depending upon the activity of the esterifying acid or anhydride. Where the acid or anhydride is a liquid at esterifying temperatures, the 1-methylolcyclohexyl-cyclohexyl-carbinol may be dissolved in or mixed with the acid or anhydride and the esterification effected by heating the mixture. Excess acid or anhydride may be distilled off or an alcohol forming an ester of relatively low boiling point with the excess or unreacted acid or anhydride may be added to the mixture and, after formation of the lower boiling ester, the mixture may be distilled and the excess acid or anhydride removed as the acid ester of the lower boiling alcohol, leaving the higher boiling ester of the 1-methylolcyclohexyl-cyclohexyl-carbinol behind. The latter may then be purified by fractionation or recrystallization or in any other suitable manner. The esterification is preferably effected employing from 1.0 to 5.0 mols of acid or equivalent anhydride for each mol of 1-methylolcycloxyl-cyclohexyl-carbinol. In addition to organic acid esters of the 1-methylolcyclohexyl-cyclohexyl-carbinol, the latter may also be esterified with inorganic acids, such as sulfuric acid and compounds of valuable detergent and wetting properties obtained.

The etherification of 1-methylolcyclohexyl-cyclohexyl-carbinol may be effected conveniently employing suitable etherifying agents and etherification procedures.

In order further to illustrate our invention but without being limited thereto the following examples are given:

Example I

The diacetate of 1-methylolcyclohexyl-cyclohexyl-carbinol may be formed in the following manner. 25 parts by weight of the 1-methylolcyclohexyl-cyclohexyl-carbinol are mixed with 25 parts by weight of acetic anhydride and heated to 93° C. for fifteen minutes. Eight parts by weight of ethyl alcohol are then added, the mixture warmed gently for 1 minute, so that the alcohol reacts with excess acetic anhydride. The alcohol remaining is then evaporated off and carries any excess acetic anhydride off as ethyl acetate. The 1-methylolcyclohexyl-cyclohexyl-carbinol diacetate formed is purified by washing with water.

Example II

To 226 parts by weight 1-methylolcyclohexyl-cyclohexyl-carbinol in solution in 500 parts diethyl ether is gradually added 46 parts sodium in ribbon form. After the reaction has subsided, 126 parts dimethyl sulfate is added with stirring at such a rate as to keep the mixture briskly refluxing. When the addition of dimethyl sulfate has been completed, the mixture is refluxed in a water bath for twenty-four hours, then washed three times with twice its volume of water. The ether solution is dried with anhydrous sodium sulfate and filtered. The ether is then evaporated off, leaving 1-methylolcyclohexyl-cyclohexyl-carbinol dimethyl ether.

The valuable $\Delta^3$-tetrahydrobenzaldol may also be oxidized to yield high molecular weight acids which may be employed in the synthesis of various other high molecular weight derivatives.

It is to be understood that the foregoing detailed description is given merely by way of illustration and that many variations may be made therein without departing from the spirit of our invention.

Having described our invention, what we desire to secure by Letters Patent is:

1-methylolcyclohexyl-cyclohexyl-carbinol diacetate.

JOSEPH E. BLUDWORTH.
DONALD P. EASTER.

Certificate of Correction

Patent No. 2,426,162.

August 26, 1947.

JOSEPH E. BLUDWORTH ET AL.

It is hereby certified that error appears in the printed specification of the above numbered patent requiring correction as follows: Column 3, line 16, for "methylolcycloxyl" read *methylolcyclohexyl*; and that the said Letters Patent should be read with this correction therein that the same may conform to the record of the case in the Patent Office.

Signed and sealed this 4th day of November, A. D. 1947.

[SEAL]

THOMAS F. MURPHY,
*Assistant Commissioner of Patents.* and the esterification effected by heating the mixture. Excess acid or anhydride may be distilled off or an alcohol forming an ester of relatively low boiling point with the excess or unreacted acid or anhydride may be added to the mixture and, after formation of the lower boiling ester, the mixture may be distilled and the excess acid or anhydride removed as the acid ester of the lower boiling alcohol, leaving the higher boiling ester of the 1-methylolcyclohexyl-cyclohexyl-carbinol behind. The latter may then be purified by fractionation or recrystallization or in any other suitable manner. The esterification is preferably effected employing from 1.0 to 5.0 mols of acid or equivalent anhydride for each mol of 1-methylolcycloxyl-cyclohexyl - carbinol. In addition to organic acid esters of the 1-methylolcyclohexyl-cyclohexyl-carbinol, the latter may also be esterified with inorganic acids, such as sulfuric acid and compounds of valuable detergent and wetting properties obtained.

The etherification of 1-methylolcyclohexyl-cyclohexyl-carbinol may be effected conveniently employing suitable etherifying agents and etherification procedures.

In order further to illustrate our invention but without being limited thereto the following examples are given:

Example I

The diacetate of 1-methylolcyclohexyl-cyclohexyl-carbinol may be formed in the following manner. 25 parts by weight of the 1-methylolcyclohexyl-cyclohexyl-carbinol are mixed with 25 parts by weight of acetic anhydride and heated to 93° C. for fifteen minutes. Eight parts by weight of ethyl alcohol are then added, the mixture warmed gently for 1 minute, so that the alcohol reacts with excess acetic anhydride. The alcohol remaining is then evaporated off and carries any excess acetic anhydride off as ethyl acetate. The 1-methylolcyclohexyl-cyclohexyl-carbinol diacetate formed is purified by washing with water.

Example II

To 226 parts by weight 1-methylolcyclohexyl-cyclohexyl-carbinol in solution in 500 parts diethyl ether is gradually added 46 parts sodium in ribbon form. After the reaction has subsided, 126 parts dimethyl sulfate is added with stirring at such a rate as to keep the mixture briskly refluxing. When the addition of dimethyl sulfate has been completed, the mixture is refluxed in a water bath for twenty-four hours, then washed three times with twice its volume of water. The ether solution is dried with anhydrous sodium sulfate and filtered. The ether is then evaporated off, leaving 1-methylolcyclohexyl-cyclohexyl-carbinol dimethyl ether.

The valuable $\Delta^3$-tetrahydrobenzaldol may also be oxidized to yield high molecular weight acids which may be employed in the synthesis of various other high molecular weight derivatives.

It is to be understood that the foregoing detailed description is given merely by way of illustration and that many variations may be made therein without departing from the spirit of our invention.

Having described our invention, what we desire to secure by Letters Patent is:

1-methylolcyclohexyl-cyclohexyl-carbinol diacetate.

JOSEPH E. BLUDWORTH.
DONALD P. EASTER.

---

Certificate of Correction

Patent No. 2,426,162.

August 26, 1947.

JOSEPH E. BLUDWORTH ET AL.

It is hereby certified that error appears in the printed specification of the above numbered patent requiring correction as follows: Column 3, line 16, for "methylolcycloxyl" read *methylolcyclohexyl*; and that the said Letters Patent should be read with this correction therein that the same may conform to the record of the case in the Patent Office.

Signed and sealed this 4th day of November, A. D. 1947.

[SEAL]

THOMAS F. MURPHY,
*Assistant Commissioner of Patents.*